(12) United States Patent
Haehnichen

(10) Patent No.: US 9,800,778 B2
(45) Date of Patent: Oct. 24, 2017

(54) CAMERA ORIENTATION NOTIFICATION SYSTEM

(71) Applicant: QUALCOMM Incorporated, San Diego, CA (US)

(72) Inventor: Steven Haehnichen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/805,076

(22) Filed: Jul. 21, 2015

(65) Prior Publication Data

US 2017/0026568 A1  Jan. 26, 2017

(51) Int. Cl.
| | |
|---|---|
| *H04N 5/222* | (2006.01) |
| *H04N 5/232* | (2006.01) |
| *G06F 3/0346* | (2013.01) |
| *G06F 3/16* | (2006.01) |
| *G06K 9/46* | (2006.01) |
| *G08B 3/10* | (2006.01) |
| *G08B 6/00* | (2006.01) |
| *H04N 5/225* | (2006.01) |
| *F16M 13/04* | (2006.01) |
| *G03B 17/56* | (2006.01) |
| *G03B 17/18* | (2006.01) |

(52) U.S. Cl.
CPC ........ *H04N 5/23222* (2013.01); *F16M 13/04* (2013.01); *G03B 17/561* (2013.01); *G06F 3/0346* (2013.01); *G06F 3/167* (2013.01); *G06K 9/4661* (2013.01); *G08B 3/10* (2013.01); *G08B 6/00* (2013.01); *H04N 5/2251* (2013.01); *H04N 5/23248* (2013.01); *G03B 17/18* (2013.01); *H04N 5/23203* (2013.01)

(58) Field of Classification Search
CPC .................................................. H04N 5/23293
USPC ..................................................... 348/333.02
See application file for complete search history.

(56) References Cited

U.S. PATENT DOCUMENTS 4,569,579 A * 2/1986 Kangas .................. F16M 11/16
248/180.1
5,541,697 A   7/1996 McIntyre
(Continued)

FOREIGN PATENT DOCUMENTS

EP           2464094 A1    6/2012
WO     WO-2006083563 A2    8/2006
(Continued)

OTHER PUBLICATIONS

GoPRO, Inc., "User Manual Hero3+ Silver", Sep. 9, 2014 (Sep. 9, 2014), 36 Pages, XP055293644, Retrieved from the Internet: URL: http://cbcdn2.gp-static.com/uploads/product_manual/file/195/UM_H3PlusSilver_ENG_REVB_WEB.pdf [retrieved on Aug. 4, 2016], 36 pages.

(Continued)

*Primary Examiner* — Anthony J Daniels

(57) ABSTRACT

This disclosure provides systems, methods, and apparatus, including computer programs encoded on computer storage media, for notifying a user when a device including a camera has moved from a desired orientation. The orientation of the camera can be determined by one or more sensors and/or image processing techniques. The user may be notified with a non-visual cue, such as an audible sound or a haptic alert. In some aspects, a user may be notified when the device including the camera is substantially level.

27 Claims, 7 Drawing Sheets

(56) References Cited

U.S. PATENT DOCUMENTS

| | | | |
|---|---|---|---|
| 6,512,846 B1 | 1/2003 | Luo | |
| 8,676,047 B2* | 3/2014 | Ueyama | G01C 9/08 348/333.02 |
| 8,860,818 B1* | 10/2014 | Sachs | H04N 5/23216 348/180 |
| 9,057,935 B2* | 6/2015 | Vieira Caeiro Dias Antunes | F16M 11/123 |
| 2005/0185086 A1* | 8/2005 | Onozawa | H04N 5/23212 348/349 |
| 2009/0017880 A1* | 1/2009 | Moore | G01C 9/06 455/575.1 |
| 2011/0109756 A1* | 5/2011 | Yamazaki | G03B 5/00 348/208.99 |
| 2012/0062691 A1* | 3/2012 | Fowler | F16M 11/10 348/36 |
| 2012/0062702 A1* | 3/2012 | Jiang | G06T 7/0044 348/46 |
| 2012/0177351 A1* | 7/2012 | Yasuda | G03B 17/18 396/50 |
| 2014/0139667 A1 | 5/2014 | Kang | |
| 2014/0267743 A1 | 9/2014 | Tapia et al. | |
| 2015/0009347 A1 | 1/2015 | O'Donnell et al. | |
| 2015/0036047 A1 | 2/2015 | Bledsoe | |
| 2015/0279081 A1* | 10/2015 | Monk | G06T 3/0031 345/419 |
| 2016/0062590 A1* | 3/2016 | Karunamuni | G06F 3/0488 715/863 |

FOREIGN PATENT DOCUMENTS

| | | |
|---|---|---|
| WO | WO-2008020339 A1 | 2/2008 |
| WO | WO-2014144959 A1 | 9/2014 |

OTHER PUBLICATIONS

International Search Report and Written Opinion—PCT/US2016/034369—ISA/EPO—dated Aug. 16, 2016.

Wang L., et al., "Image Orientation Detection With Integrated Human Perception Cues (or which way is up)", International Conference on Image Processing, (Cat. No. 03CH37429), Barcelona, Spain, Sep. 14-17, 2003, vol. 2, XP010669736, ISBN: 978-0-7803-7750-9, pp. 539-542.

* cited by examiner

CAMERA ORIENTATION NOTIFICATION SYSTEM

TECHNICAL FIELD

This disclosure generally relates to digital image and video recorders. More particularly, this disclosure describes systems, methods, and devices configured to provide an alert to a camera user regarding the orientation of the camera.

DESCRIPTION OF THE RELATED TECHNOLOGY

Digital cameras and video recorders are commonly mounted to people, objects, automobiles, and even animals. Body-mounted and/or point-of-view cameras are popular with outdoor sport enthusiasts. Such cameras may be generally mounted to equipment such as helmets, windshields, articles of clothing, surfboards, and the like, to offer exciting points of view. In addition, body-mounted and/or automobile mounted cameras may be utilized by users such as law enforcement agents.

SUMMARY

The systems, methods, and devices of the disclosure each have several innovative aspects, no single one of which is solely responsible for the desirable attributes disclosed herein.

One innovative aspect of the subject matter described in this disclosure can be implemented in a system that includes a device having at least one camera, a mount couplable to the device, the mount configured to secure the device in a desired orientation, an orientation sensor configured to determine the orientation of the device with respect to the mount, and a notification unit coupled to the orientation sensor and configured to trigger a notification when the orientation of the device changes with respect to the mount. In some aspects, the notification is non-visual. The non-visual notification may include an audible sound and/or a haptic alert. In some aspects, the notification is configured to cue a user when the user cannot monitor images captured by the camera. The notification unit may be configured to trigger a notification when the orientation sensor determines that the camera is substantially level with respect to a horizon line. In some aspects, the notification unit provides a signal to a separate device. The separate device may be configured to alert a user when the separate device receives the signal from the notification unit.

Another innovative aspect of the subject matter described in this disclosure can be implemented in a method that includes selecting a desired orientation for a camera; securing the camera in the desired orientation, and emitting a non-visual cue from the camera when the camera is moved from the desired orientation. In some aspects, the method includes determining when the camera is substantially level and emitting a non-visual cue when the camera is substantially level. Selecting a desired orientation for the camera may include selecting a position where a framing of a scene viewed by the camera is substantially level.

Another innovative aspect of the subject matter described in this disclosure can be implemented in a method including determining the orientation of a camera in space, emitting a first non-visual cue when the camera is substantially level, and emitting a second non-visual cue when the camera is no longer substantially level. The first non-visual may be different from the second non-visual cue. The determining step may include capturing at least a first image with the camera and processing the captured image. The determining step may include capturing at least a second image with the camera and comparing the second captured image with the first captured image.

Another innovative aspect of the subject matter described in this disclosure can be implemented in a device including a video recording device that includes a means for determining the orientation of recorded video data and a means for emitting a non-visual cue when the orientation of the recorded video data changes from a desired position. In some aspects, the means for determining the orientation of the recorded video includes at least one image processor capable of determining the orientation of a reference line in the recorded video data. A desired position may be a position of the camera when the camera is secured to a camera mount or a position that frames a desired scene viewed by the camera.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. In addition, the teachings are not intended to be limited to the implementations depicted solely in the Figures, but instead have wide applicability as will be readily apparent to a person having ordinary skill in the art.

BRIEF DESCRIPTION OF THE DRAWINGS

Like reference numbers and designations in the various drawings indicate like elements.

DETAILED DESCRIPTION

Figure 1:
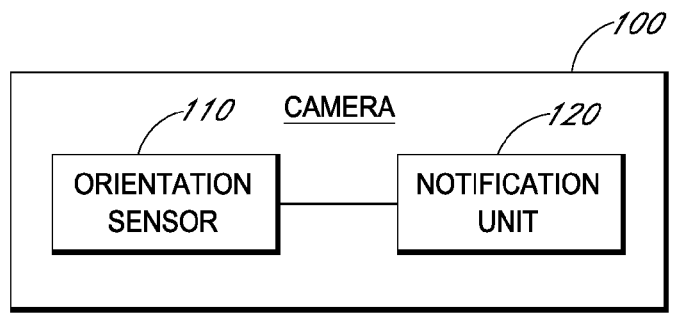
FIG. 1 illustrates an exemplary implementation of a camera including an orientation sensor and a notification unit.

The following detailed description is directed to certain implementations for the purposes of describing the innovative aspects. However, the teachings herein can be applied in a multitude of different ways.

Image capture devices, such as cameras, are used every day to capture image data which may include, for example, video data. These image capture devices may be standalone devices such as digital cameras, or may be integrated with other devices such as smartphones or other electronic devices. Such image capture devices may, in some cases, be worn or otherwise mounted to a person or object. It is often difficult for a person wearing an image capture device to determine the orientation or pose of the image capture device in space and/or to determine what the image capture device is actually recording. This is particularly true for cameras that do not include a viewfinder, preview screen, or similar screen, or are mounted in a position in which a viewfinder or similar screen cannot be viewed by the wearer. Helmet mounted cameras, for example, may move from their intended position during use and such movement often goes unnoticed because the helmet mounted camera cannot be seen or monitored by the wearer. This may result in the capturing of footage of the ground or the sky, rather than the desired action taking place in front of the wearer (e.g., one or more portions of a scene disposed between the sky and the ground). Even cameras that can be at least partially viewed by the user, such as badge cameras or other wearable cameras, may have their orientation, or pose, or direction obscured or covered while the device is in use.

Thus, it is desirable to alert a camera user and/or camera wearer when the camera's desired pose or line of sight is changed or obscured. In some implementations, it may be desirable to alert a user when the camera has moved with respect to a pre-selected orientation in space. In some implementations, it may be desirable to alert a user when the camera has moved relative to a camera mount after the camera was first secured in a desired position by the camera mount. In some implementations, it may be desirable to alert a user when the camera has moved relative to a reference contained in the captured image and/or video.

The alert may be in the form of an audible alert or other non-visual alert, especially when the camera cannot be seen by the wearer and/or when image data captured by the camera cannot be seen or monitored close in time to the capturing. In this way, the devices, methods, and systems disclosed herein may result in more reliable recordings.

It also may be difficult to determine when a camera is substantially level without looking through a camera's viewfinder or preview display. This is particularly true for cameras that cannot be seen by the wearer, such as often the case with helmet-mounted cameras. As such, it is desirable to alert a camera wearer when the camera's desired line of sight or pose is substantially level. In this way, the camera user can ensure that the camera will capture a level and well-framed image.

Particular implementations of the subject matter described in this disclosure can be implemented to realize one or more of the following potential advantages. Camera users will be able to tell when their device is pointed in the correct direction without actually looking at the camera. In this way, the images that the user wishes to be recorded may be captured more reliably and image storage space will no longer be wasted on unusable recordings. In addition, camera users will be able to tell if and when their device may be separating from its mount or user. For example, in some implementations a camera and/or a camera mount may be coming loose and require attention before it detaches. Providing a notification and/or alerting the user of this camera movement may prevent the camera from actually detaching from the user or mount; thus preventing damage to the camera and/or loss of the camera.

The described implementations may be implemented in any device that is configured to capture an image, whether in motion (e.g., video) or stationary (e.g., still image). More particularly, it is contemplated that the implementations may be implemented in or associated with a variety of electronic devices such as, but not limited to, mobile telephones, multimedia internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, GPS receivers/navigators, cameras (digital or film), hand-held cameras, action sports cameras, MP3 players, camcorders, game consoles, wrist watches, electronic reading devices (e.g., e-readers), and personal computers.

Turning now to the Figures, specific non-limiting implementations will be described. FIG. 1 illustrates an example implementation that includes a camera 100 having at least one orientation sensor 110 and a notification unit 120. The orientation sensor 110 and/or notification unit 120 may be disposed on or at least partially within the camera 100 or other device that includes a camera. In some implementations, the orientation sensor 110 is disposed completely or partially within a camera and/or a camera accessory. In some implementations, the orientation sensor 110 is physically or mechanically coupled to a camera and/or a camera accessory. In some implementations, the orientation sensor 110 is wirelessly coupled to a camera and/or a camera accessory.

The orientation sensor 110 can be configured to determine the orientation of the camera 100 in space. In some implementations, the orientation sensor 110 can be configured to determine when the camera 100 is in the desired orientation (e.g., substantially level in space or where the captured image is substantially level or where the captured image captures a desired image frame or scene). In some implementations, when the orientation sensor 110 determines that the camera is in the desired orientation, it signals the notification unit 120 to alert the user.

In some implementations, the orientation sensor 110 can be configured to determine when the camera 100 has moved from a desired orientation. For example, a user may move the camera into a desired position and secure the camera in this desired position. If and when the camera later moves from this desired position, the orientation sensor 110 may detect the movement and signal the notification unit 120 to alert the user.

In some implementations, the camera 100 includes more than one orientation sensor 110. For example, the orientation sensor 110 may include a plurality of accelerometers configured to determine the angle of the camera relative to the earth. In some implementations, the orientation sensor 110 includes a 3-Axis magnetometer configured to be calibrated for earth or for another local metal body. As discussed above, the orientation sensor 110 may include gravity sensors, levels, gyroscopes, accelerometers, motion sensors, angular rotational sensors, switches, magnetometers, image processors, and the like. The orientation sensor 110 may be coupled to or include a processor.

Although only a single orientation sensor 110 is depicted in FIG. 1, one or more orientation sensors 110 may be used to determine the orientation of the camera in space. In some implementations, at least one orientation sensor 110 may be used to determine the orientation of the camera 100 with respect to a reference position. For example, at least one orientation sensor 110 may be used to determine the orientation of the camera 100 with respect to a camera accessory and/or a camera mount. In other implementations, the at least one orientation sensor 110 may be used to determine the orientation of the camera 100 with respect to a wearer, a desired camera position, or a position that provides the desired pose or point of view to be captured by the camera 100. In some implementations, determining the orientation of the camera 100 with respect to another object may include determining when the orientation of the camera 100 with respect to the other object has changed.

The at least one orientation sensor 110 may include one or more accelerometers, levels, gyroscopes, gravity sensors, motion sensors, angular rotational sensors, switches, magnetometers, image processors, and the like. In some implementations, the at least one orientation sensor 110 may be configured to determine when a camera is in a substantially horizontal position (e.g. when the camera is positioned to capture a landscape view). In some implementations, the at least one orientation sensor 110 may be configured to determine when a camera is in a substantially vertical position (e.g. when the camera is positioned to capture a portrait view). In some implementations, the at least one orientation sensor 110 may be configured to determine when a camera is in a substantially horizontal and level position. In some implementations, the threshold for determining whether a camera is in a substantially vertical or horizontal position can be set such there is a range of tolerance in which the camera is positioned such that a viewer would not notice that the captured image is tilted or angled. This tolerance may in some implementations be user-adjustable. In some implementations, the at least one orientation sensor 110 may be configured to determine when a camera is offset from level by a given angle. For example, the one or more sensors may be configured to determine when the camera is tilted 25°, or 45°, or 90°, or any angle in between, from level.

In some implementations, the at least one orientation sensor 110 may be configured to determine when a camera is substantially parallel with the horizon or a horizon line in a captured image. The at least one orientation sensor 110 may be configured to determine a particular pitch, yaw, and/or roll of a camera or camera accessory. In some implementations, the at least one orientation sensor 110 may be activated and/or deactivated. The at least one orientation sensor 110 may be activated or deactivated automatically or manually.

In some implementations, the at least one orientation sensor 110 includes at least one accelerometer configured to provide orientation information for the camera with respect to the earth's gravity. Such orientation information can be used to determine the relative position of the camera with respect to a horizon. The at least one accelerometer may be a single axis, or a dual axis, or a three axis accelerometer. The at least one orientation sensor 110 may include hardware and/or software or combinations thereof.

In some implementations, the at least one orientation sensor 110 may be used to determine if a camera is in use. For example, in some implementations, the at least one orientation sensor 110 may be configured to determine if a camera is in motion or is not in motion. In some implementations, when the at least one orientation sensor 110 determines that a camera is not in motion, the orientation and/or notification system may be activated. For example, in the context of a helmet mounted camera, the system may be configured to determine if the helmet mounted camera is substantially level with the horizon when the user is substantially at rest. In some implementations the orientation and notification system may be deactivated when the camera is in motion. For example, in the context of a helmet mounted ski camera, the camera may perform a self-check when the camera is at rest (e.g. at the beginning and the end of a ski run) to determine if the helmet mounted camera is in the desired orientation. The system may notify the user when the camera is in the desired position by emitting an alert. The alert may be non-visual. Additionally and/or alternatively, the system may notify the user when the camera is no longer in the desired position by emitting an alert such as a non-visual alert.

In some implementations, the at least one orientation sensor 110 at least partially includes an image-based analysis system. That is to say, one or more image processing methods and/or devices may be used to in a determination of the orientation of a camera in space. For example, the image captured and/or viewed by the camera may be used to determine, whether alone or in conjunction with other analysis or sensors, if the camera is substantially level. This may be accomplished, for example, by determining the relative brightness and/or luminance of pixels in the captured image. In other implementations, a reference line may be used to determine if the camera is substantially level. For example, a horizon line may be defined as the boundary between the sky and the earth in a captured image. Such a horizon line or static line or object (e.g. a helmet visor or hood of a car) in a captured image may be used as a reference line. Such a line or other relatively static line in a captured image may be a relatively continuous line where a sharp separation occurs in brightness, luminance, and/or contrast occurs. Thus, a video signal and/or plurality of images may be sampled at different points in time and image processing may be used to determine if and when this reference line moves in a recorded video. In other implementations, an analysis of pixel color and/or brightness values may be used to determine whether a scene captured by the camera includes an appropriate blend of background and foreground. For example, in a winter sport mode the orientation sensor 110 may perform one or more computer vision or image processing algorithms to determine what percentage of a frame of image data depicts snow. In this way, the relative orientation of the camera may be determined using image processing.

The notification unit 120 may be configured to trigger a notification. In some implementations, the notification unit 120 is configured to emit a signal and/or provide a cue or alarm or alert to a user. In some implementations, the notification unit 120 may include or be coupled to an alarm, speaker, light, and/or motor. In some implementations the notification unit 120 may comprise an alarm, speaker, light, and/or motor. The notification unit 120 may include hardware and/or software or combinations thereof.

In some implementations, the notification unit 120 is configured to alert a user even when the user is not looking at the user's camera or camera accessory. In some implementations, the notification unit 120 is configured to alert a user when the user is not looking through the camera viewfinder or at the camera display.

In some implementations, the notification unit 120 is configured to provide a non-visual cue to a user. The non-visual cue may include, for example, an audible sound and/or a haptic alert such as a vibration. In some implementations the haptic alert includes a tap or larger impact on a surface. The haptic alert may be caused by a vibrator, motor, solenoid, and the like.

In some implementations, the notification unit 120 is configured to provide a visual cue to a user. The visual cue may include, for example, a light or a flashing light. The notification unit 120 may be disposed completely or partially within a camera and/or a camera accessory. In some implementations, the notification unit 120 is disposed completely or partially within a camera and/or a camera accessory. In some implementations, the notification unit 120 is physically or mechanically coupled to a camera and/or a camera accessory. In some implementations, the notification unit 120 is wirelessly coupled to a camera and/or a camera accessory. In some implementations, the notification unit 120 or alarm may be activated and/or deactivated. The notification unit 120 or alarm may be activated or deactivated automatically or manually. The notification unit 120 may be coupled to or include a processor.

In some implementations, the notification unit 120 may be couplable to a companion device. A coupling between the notification unit 120 and the companion device may be wired or wireless. For example, a person may be using headphones and listening to their phone or music player. Thus, the notification unit 120 may be configured to communicate with the phone or music player such that an audio notification is delivered by the phone or music player to alert the user. In some implementations, the notification unit 120 may emit a signal to a companion device. The signal may be a wireless signal. The companion device may cause the companion device to alert a user.

In some implementations, the notification unit 120 and/or orientation sensor(s) 110 may only function when a user desires them to. For example, a camera or camera accessory may include a user interface or button that activates and/or deactivates the notification unit 120 and/or orientation sensor(s) 110. In some implementations, the notification unit 120 and/or orientation sensor(s) 110 may only function for a discrete time period after the camera starts recording and/or for a discrete time period after the camera stops recording. In this way, power consumption may be reduced. In some implementations, the user may be notified when the camera is in the desired position or not at the beginning of a recording and/or at the end of a recording.

In some implementations, the notification unit 120 can be configured to provide more than one alert. For example, the notification unit 120 may emit an audible and a vibratory alert or other such combinations. In some implementations the notification unit 120 may emit various audible cues. For example, the notification unit 120 may be configured to emit a first audible tone when the camera is placed into a desired position and a second audible tone that is different from the first audible tone when the camera is moved from its desired position. In some implementations, the notification unit 120 is configured to only emit an alert when the camera is not substantially level.

In some implementations, the notification unit 120 is configured to provide a range of audible tones or audible tones at different time intervals or frequencies depending on the orientation of the camera. For example, the notification unit 120 may emit an audible tone less frequently as the camera is positioned closer to being substantially level in space and emit an audible tone more frequently as the camera is positioned further away from level. In some implementations, the notification unit 120 emits as audible tone having a frequency that varies as the camera is positioned closer or farther away from level. In this way, a camera user may be able to level a camera without having to look at the camera or at the camera view finder.

In some implementations, the system may be configured to automatically remove the audible recorded sounds emitted by the system. In this way, the recoded audio is not adversely affected or distorted. That is to say, in some implementations, the camera and/or camera accessory may be configured to remove and/or filter out the sounds that are emitted by the camera and/or camera mount. Thus, the camera and/or camera accessory can provide feedback without diminishing the quality of its own recorded audio.

The described implementations may be implemented in a device including a camera, and may also be implemented in a device configured to secure a camera in place or to a person or object. More particularly, it is contemplated that the implementations may be implemented in or associated with a variety of camera mounts, such as, tripods, securements, accessories, harnesses, grips, extensions, selfie-sticks, stands, suction cups, and the like. Such camera accessories may contain one or more of the following: power supplies, sensors, processors, circuitry, lights, motors, user interfaces, speakers, microphones, and/or notification units. That is to say, the described implementations may be integrated within a camera, within a camera mount or other accessory, or partially within both a camera and an associated camera mount or other accessory. Thus, the described implementations may be implemented in connection with cameras that are not independently capable of the described functionality by being associated with or operated in conjunction with a companion device and/or camera accessory.

A mount may be configured to secure camera at a desired orientation in space. For example, the mount may allow for a camera to be positioned with a desired pitch, roll, and/or yaw. In some implementations, the mount may include one or more movable arms that are coupled to a device having a camera and another object (e.g. a helmet).

The camera and/or camera accessory may be configured to communicate with another companion device. The camera and/or camera accessory may be physically or electronically coupled together. The camera and/or camera accessory may be physically or electronically coupled to a companion device. The camera and/or camera accessory may be configured to communicate wirelessly with each other and/or with another companion device.

Figure 2:
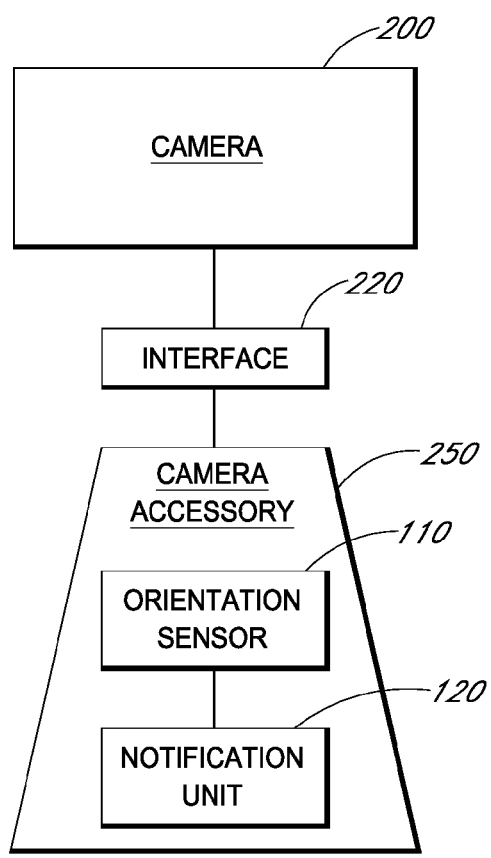
FIG. 2 illustrates an exemplary implementation of a system that includes a camera and a camera accessory including an orientation sensor and a notification unit.

FIG. 2 illustrates an example implementation that includes a camera accessory 250 having at least one orientation sensor 110 and a notification unit 120. The orientation sensor 110 and/or notification unit 120 may be disposed on or at least partially within the camera accessory 250. As discussed above, the camera accessory 250 may include a camera mount. The orientation sensor 110 can be configured to determine the orientation of the camera accessory 250 in space. In some implementations, the orientation sensor 110 is configured to determine when the camera 100 is in the desired orientation (e.g., substantially level in space or where the captured image is substantial level or where the captured image captures a desired image frame).

As shown in FIG. 2, an interface 220 may couple a camera 200 with the camera accessory 250. The interface 220 may include a wired or wireless connection. The interface 220 may include a user interface. The user interface may be used to activate and/or deactivate the orientation sensor 110 and/or the notification unit 120.

In some implementations, the notification unit 120 may be disposed on or at least partially within the camera 200 and the orientation sensor 110 may be disposed on or at least partially within the camera accessory 250. In some implementations, the notification unit 120 may be disposed on or at least partially within the camera accessory 250 and the orientation sensor 110 may be disposed on or at least partially within the camera 200. In some implementations the notification unit 120 may be located within a companion device such as a smart phone.

Figure 3:
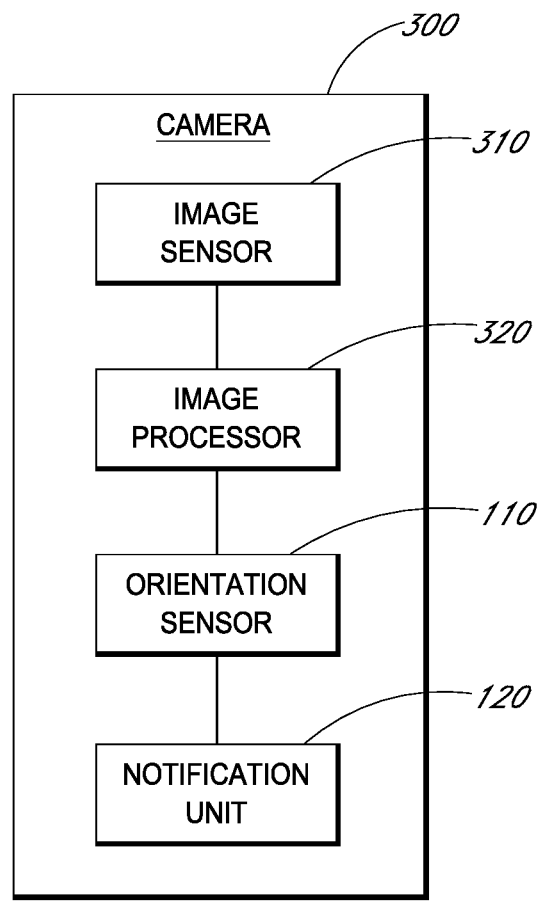
FIG. 3 illustrates an exemplary implementation of a camera that includes an image sensor, an image processor, an orientation sensor, and a notification unit.

FIG. 3 illustrates an example implementation that includes a camera 300 having an image sensor 310, an image processor 320, an orientation sensor 110, and a notification unit 120. The image sensor 310 may capture an image that may be processed by the image processor 320. The image processor 320 may enhance or filter or modify the captured image. The orientation sensor 110 can be configured to determine the orientation of the camera 300 from the captured image alone or in part with additional sensors. As discussed above the image processor 320 and/or orientation sensor 110 may be configured to determine when a horizon line or other reference line is substantially horizontal in a captured image. In some implementations, when the orientation sensor 110 determines that the camera 300 is in the desired orientation, it signals the notification unit 120 to alert the user.

In some implementations, the desired orientation may be an orientation of a camera with respect to the outside world. In other implementations, the desired orientation may be an orientation of the camera with respect to a helmet. In some implementations, the desired orientation may be an orientation of the camera with respect to a static object in an image. For example, the desired orientation may be an orientation in which a portion of the helmet (e.g. a helmet visor) appears in approximately the same position in each image captured by the camera. In some implementations, when the orientation sensor 110 determines that the camera is no longer in the desired orientation, it signals the notification unit 120 to alert the user.

Figure 4A:
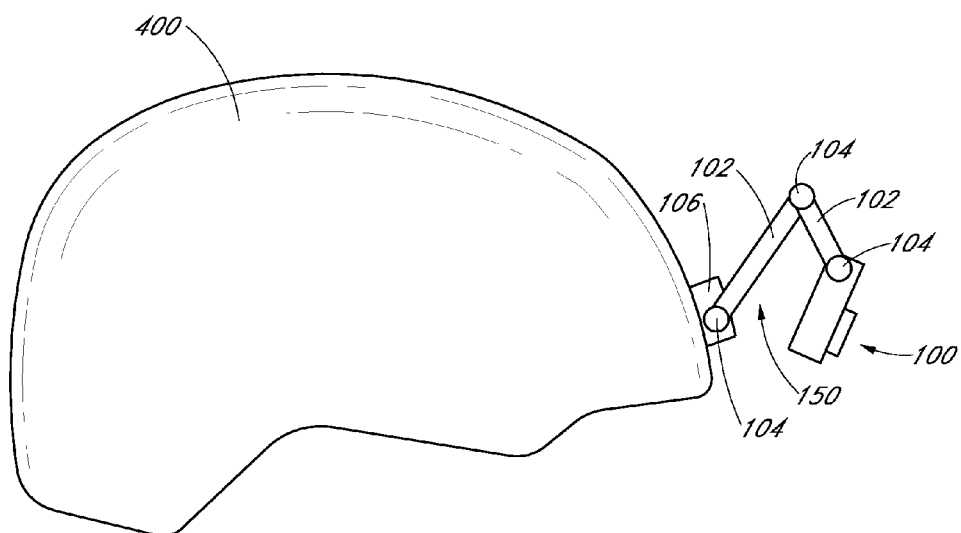
FIGS. 4A and 4B illustrate an exemplary implementation of the use of a helmet mounted camera system including an orientation sensor and a notification unit.
Figure 4B:
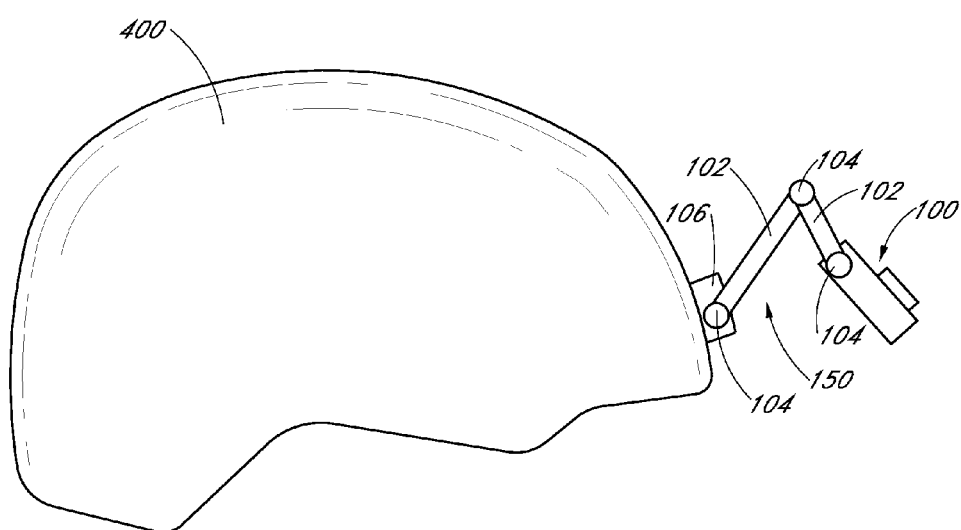

FIGS. 4A and 4B illustrate an example implementation in the context of a helmet mounted camera. As shown, a camera 100 may be secured to or supported by a helmet 400 using a mount 150. The camera 100 and/or mount 150 may include at least one orientation sensor and may also include a notification unit (not shown). The mount 150 may include two movable arms 102. The moveable arms 102 may be configured to rotate about hinges or pivot points 104. The mount 150 may be configured such that a certain threshold force is required to rotate the moveable arms 102 about the pivot points 104. In this way, when no force is applied to the mount 150, the camera 100 is secured to the helmet 400 in a desired orientation.

In other implementations, the movable arms 102 may be configured to move freely about the pivot points 104 in a first configuration and may be prevented from moving with respect to the pivot points 104 in a second configuration. In some implementations, hinges or pivot points 104 may configured to be switched between a first configuration in which the movable arms 102 can be rotated relative to the hinges or pivot points 104, and a second configuration in which movable arms 102 are substantially rotationally fixed relative to a given hinge or pivot point 104. The locking of a hinge or pivot point 104 can be achieved in any suitable manner, such as through the application of increased friction, pressure, or through the movement or insertion of a mechanical stop which inhibits rotation about the hinge or pivot point 104.

In use, a user may position the camera 100 in a desired orientation (e.g. the orientation shown in FIG. 4A). In other words, the user may secure the camera 100 in a desired orientation with respect to the mount 150 and/or helmet 400. The mount 150 may secure the camera 100 in a desired orientation. The user may input a signal to the camera 100 or mount 150 to indicate that the camera 100 is in the desired orientation. The one or more orientation sensors, located within the camera 100 and/or camera mount 150 may be configured to determine when the camera 100 and/or mount 150 moves with respect to this desired orientation. A notification unit, coupled to the orientation sensor may be configured to trigger a notification when the orientation of the camera 100 changes (e.g. as shown in FIG. 4B). In some implementations, the notification is triggered when the camera 100 moves with respect to the mount 150. The notification may be non-visual. In some implementations, the triggered notification is an audible alert. In this way, the user is alerted when the camera 100 has moved from the desired orientation. As discussed above, other mounts such as, for example, tripods, selfie-sticks, stands, suction cups, and the like can be configured in substantially the same manner.

Figure 5A:
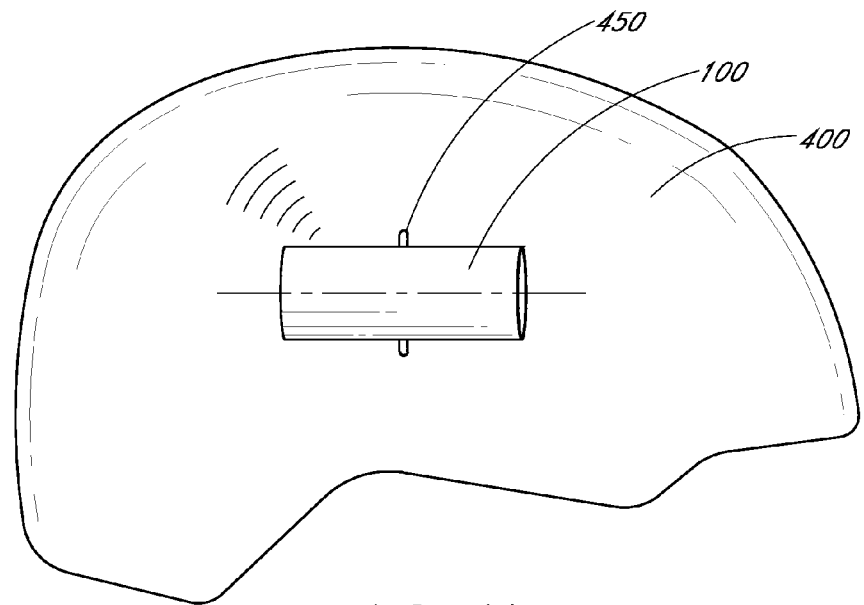
FIGS. 5A and 5B illustrate another exemplary implementation of the use of a helmet mounted camera system including an orientation sensor and a notification unit.
Figure 5B:
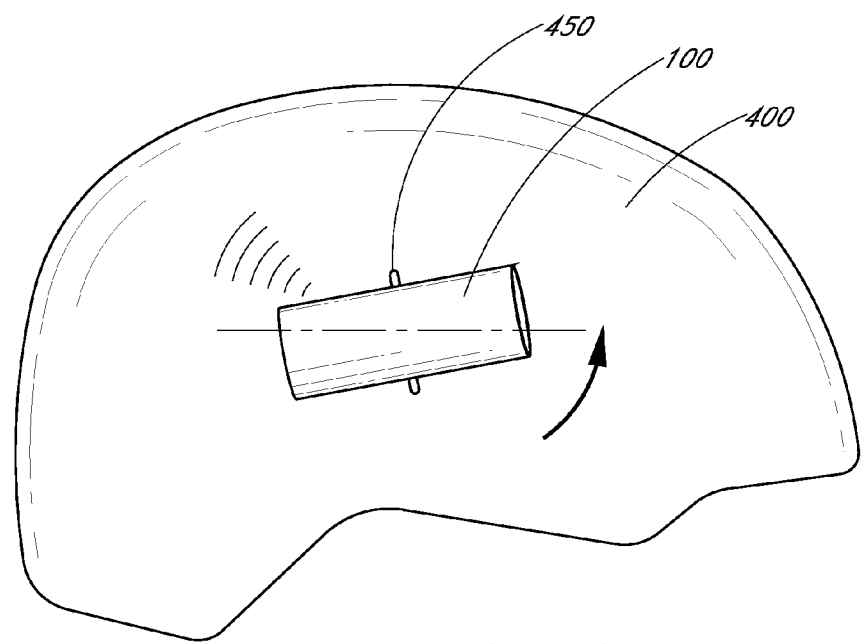

FIGS. 5A and 5B illustrate another example implementation in the context of a helmet mounted camera. As shown in FIG. 5A, a camera 100 may be secured to a helmet 400 with a mount 450. The camera 100 may include at least one orientation sensor 110 and a notification unit (not shown in FIGS. 5A and 5B). In other implementations, the camera mount 450 may include the orientation sensor 110 and/or the notification unit. As shown in FIG. 5A, the camera 100 may be configured to emit a non-visual cue when the camera 100 is in a substantially level position. When a user is wearing the helmet 400, the user cannot see the orientation of the camera 100. Thus, the non-visual cue can help the user position the camera 100 in a substantially level orientation without looking at the camera 100 or at the camera's viewer.

In some implementations, the camera 100 may be configured to communicate with a companion device such as a mobile phone or portable audio player. That is to say, the camera 100 may be configured to signal a companion device to alert a helmet wearer when the camera 100 is in a substantially level position.

In some implementations, the companion device may be capable of displaying the image that is viewed by the camera 100. In this way, the user may be able to adjust the orientation of the camera 100 until the desired camera view is obtained by looking at a preview image that is displayed on the companion device. The user may then secure the camera 100 in position and/or instruct the camera 100 that the desired camera view is obtained. If and when the camera 100 is moved from this selected position, the camera 100 can alert the user by emitting a non-visual cue and/or instructing a companion device to alert the user.

As shown in FIG. 5B, the camera 100 may be configured to emit a non-visual cue when the camera 100 is moved from the substantially level position. For example, the camera 100 may move positions if the camera 100 strikes an object and/or when the helmet wearer falls down. As shown in FIG. 5B the camera 100 has been moved upward such that camera 100 is no longer facing the desired direction. Of course, it is also contemplated that the camera 100 may be moved in other directions such as downward or side to side. In this way, a user can be alerted when the camera 100 moves from a pre-selected position. While FIGS. 5A and 5B indicate that camera 100 is used, other cameras described herein may be used in substantially the same manner.

Figure 6A:
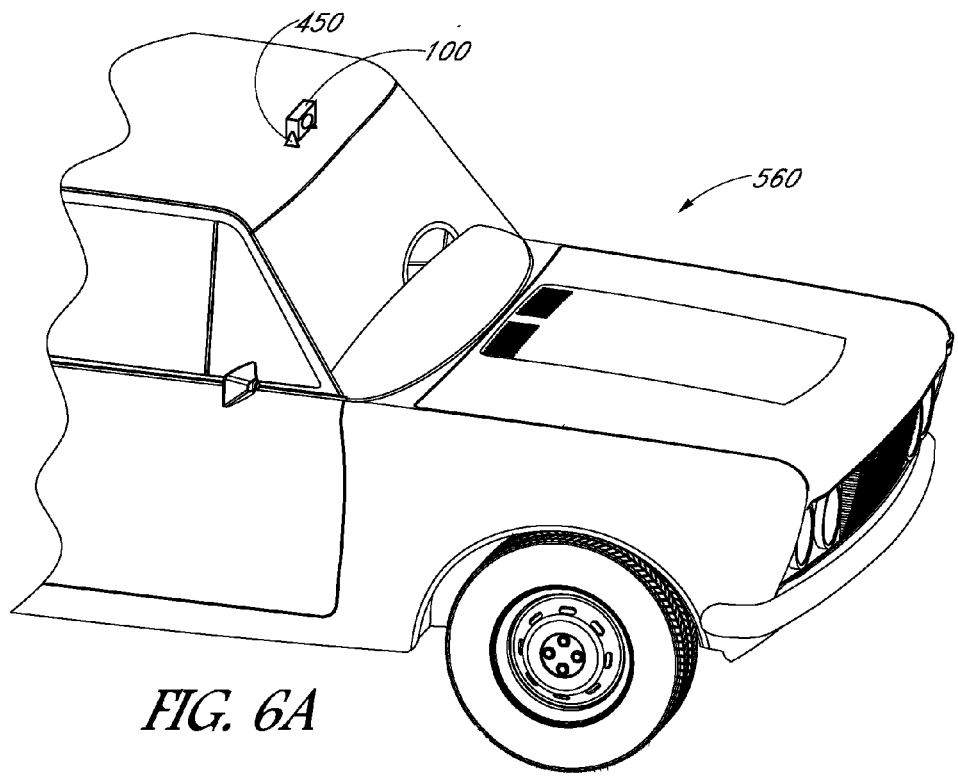
FIGS. 6A and 6B illustrate an exemplary implementation of the use of a camera mounted to an automobile and including an orientation sensor and a notification unit.
Figure 6B:
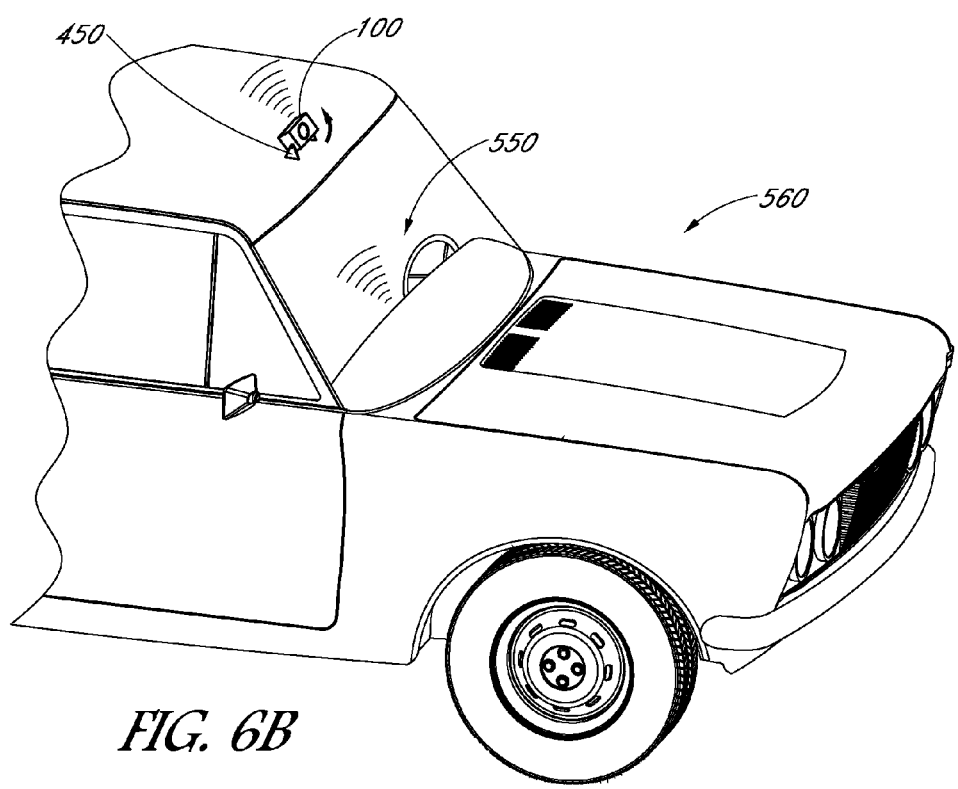

FIGS. 6A and 6B illustrate an example implementation in the context of a camera 100 mounted to an automobile 560. As shown a camera mount 450 may be used to secure the camera 100 to the roof of the automobile 560. However, the camera 100 may be secured to any portion of the automobile 560. Before the recording begins, a user may secure the camera 100 to the automobile 560 and preview the desired position for the camera 100. When the proper position of the camera 100 is selected, the user may interact with the camera 100 to notify the camera 100 of the selected camera orientation. As can be understood from the illustration of FIGS. 6A and 6B, the camera 100 may be mounted to the automobile 560 such that the camera 100 cannot be seen by the user when the user is driving. The camera 100 may include at least one orientation sensor 110 and a notification unit (not shown). In other implementations, the camera mount 450 may include the orientation sensor 110 and/or the notification unit.

As shown in FIG. 6B, if the camera 100 moves from the desired position at a later time (e.g. after a severe bump), the camera 100 can notify the user by emitting a non-visual cue. In some implementations, the camera 100 can notify the user by emitting a wireless signal that instructs a companion device such as a mobile phone or in-dash audio system 550.

As discussed above, the camera 100 may be configured to determine the orientation of the camera by using image processing techniques. For example, a camera 300 (shown in FIG. 3 may be used). The camera may, for example, be configured to determine when a horizon line moves from a desired position in a captured image. In other implementations, the camera is configured to determine when a reference object (e.g. the hood of the automobile 560) moves from a desired position in a captured image. In this way, the camera user or driver of the automobile 560 may be altered when the image being captured differs from the desired image.

Figure 7A:
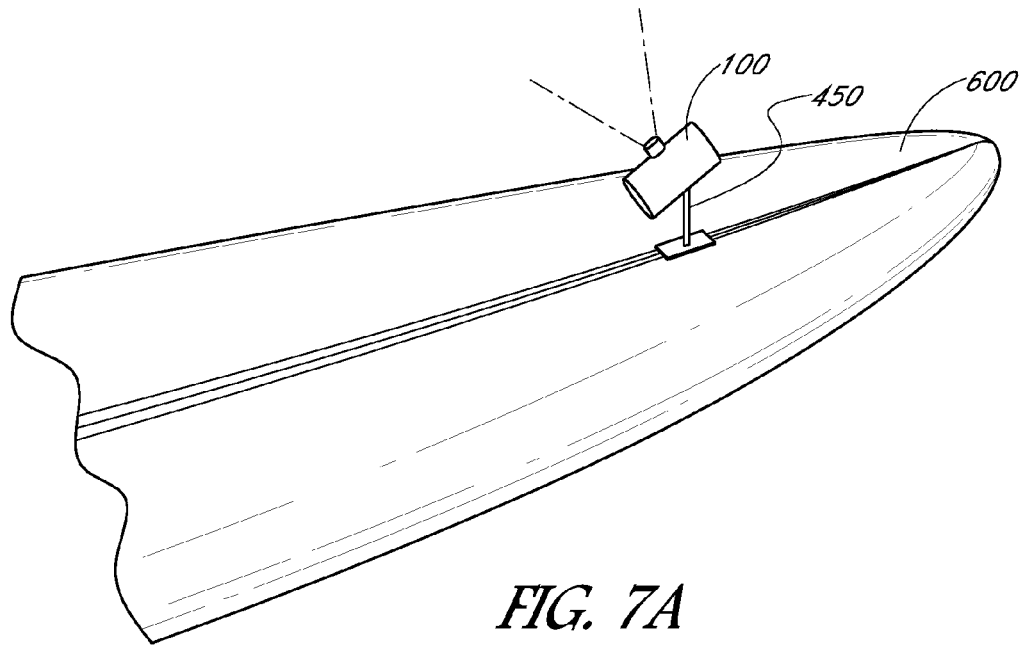
FIGS. 7A and 7B illustrate an exemplary implementation of the use of a camera mounted to a surfboard and including an orientation sensor and a notification unit.
Figure 7B:
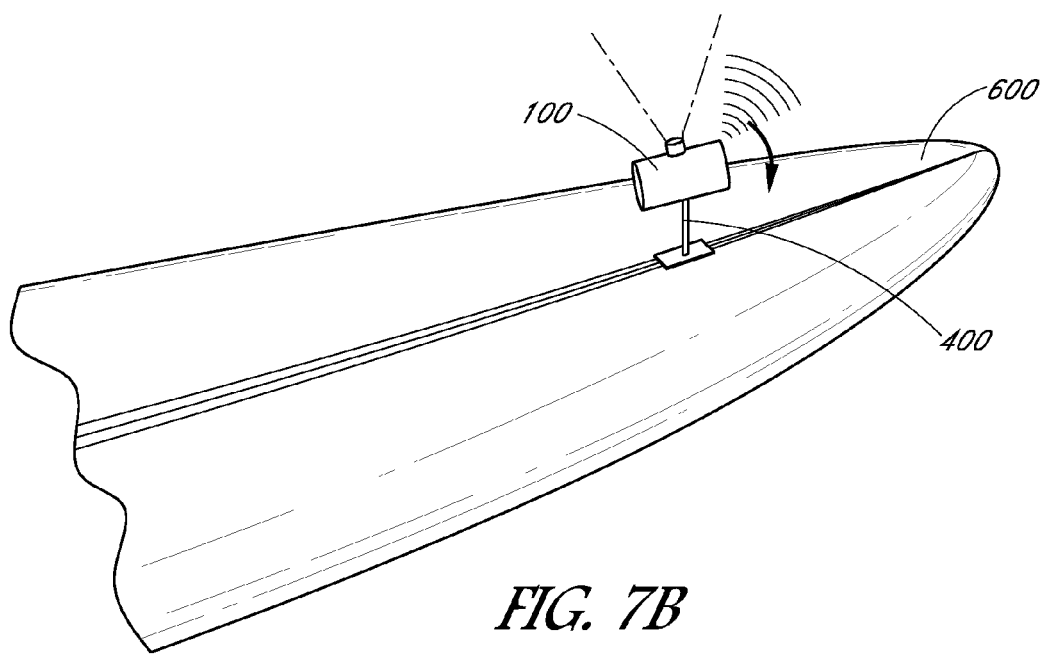

FIGS. 7A and 7B illustrate an example implementation in the context of a camera 100 mounted to a surfboard 600. As shown in FIG. 7A, the camera 100 may be mounted to a surfboard 600 with a camera mount 450. The camera may be place at a desired angle with respect to the surfboard 600 such that the rider of the surfboard appears in the captured image. As can be understood from the illustration of FIGS. 7A and 7B, the camera 100 may be mounted to the surfboard 600 such that the camera 100 can be seen by the user when the user is riding the surfboard 600. However, the user cannot see the camera's image viewer or preview screen. In addition, because the user may be concentrated on things other than the orientation of the camera 100, the user may not become aware that the camera has moved from the desired position shown in FIG. 7A. As such, the camera 100 may be configured to alert the user when the camera 100 is moved from the desired position as shown in FIG. 7B. In some implementations, the camera 100 may alert the user with a visual cue such as, for example, a flashing light. In some implementations, the camera 100 may alert the user with a non-visual cue such as, for example, an audible tone a.

Figure 8:
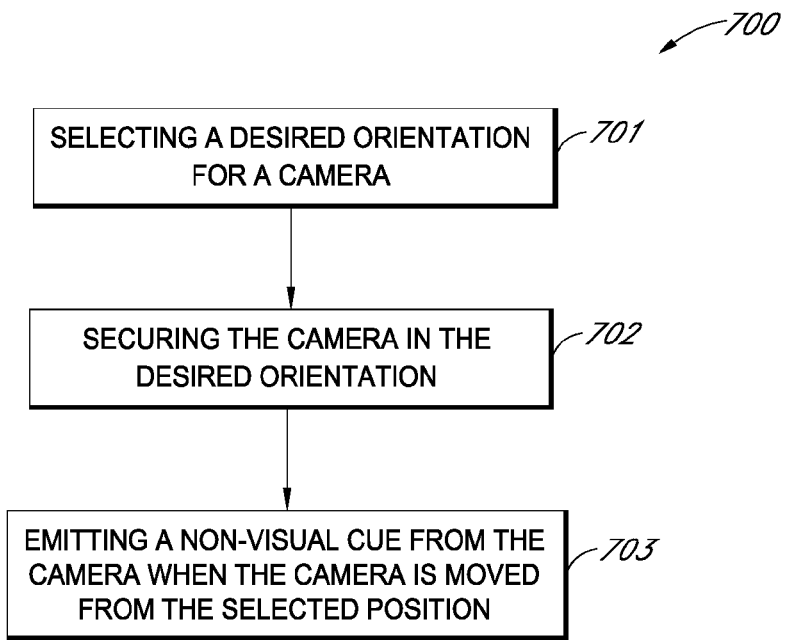
FIG. 8 illustrates an exemplary method of emitting an alert when a camera is moved from a selected orientation according to one implementation.

FIG. 8 illustrates an example method according to one implementation. As shown, the method 700 can start at block 701 by selecting a desired orientation for a camera. The method 700 can continue at block 702 by securing the camera in the desired orientation. In some implementations, the desired orientation is one in which the camera is substantially level. In some implementations, the desired orientation is a desired orientation of the camera with respect to a mount. The method 700 can continue at block 703 by emitting a non-visual cue from the camera when the camera is moved from the selected position.

Figure 9:
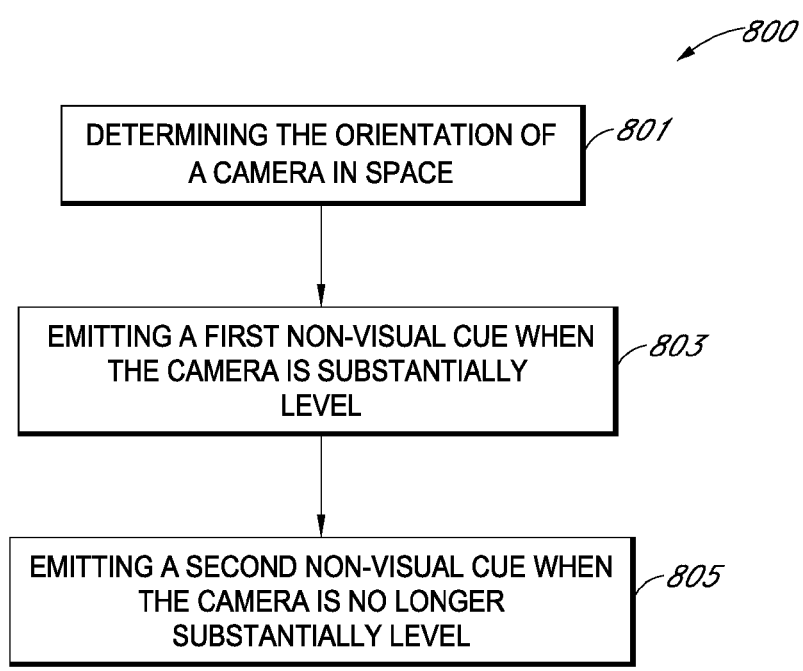
FIG. 9 illustrates another exemplary method of emitting an alert when a camera is substantially level; and emitting a second alert when the camera is no longer substantially level according to another implementation.

FIG. 9 illustrates an example method according to another implementation. As shown, the method 800 can start at block 801 by determining the orientation of a camera in space. The method 800 can continue at block 803 by emitting a first non-visual cue when the camera is substantially level. The method 800 can continue at block 805 by emitting a second non-visual cue when the camera is no longer substantially level.

While the examples described above generally depict cameras and camera mounts, it is understood that the functionality described herein may be implemented using any another device that includes a camera. For example, a smart phone may include a camera and may be mounted to an object and or person. The smart phone may include one or more orientation sensors and/or gyroscopes. In some implementations, the smart phone may be physically or mechanically coupled to a mount. The mount may hold the smart phone in a secured position. The smart phone and/or mount may be configured to determine when the smart phone moves with respect to the mount. In some implementations, the mount includes one or more orientation sensors configured to determine when the smart phone moves with respect to a mount. In some implementations, the mount includes a notification unit. In some implementations, the mount includes a speaker. In some implementations, the smart phone includes a notification unit.

The various illustrative logics, logical blocks, modules, circuits, and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the systems and devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
a device having at least one camera, the device capable of being secured to a mount to secure the device in a desired orientation;
an orientation sensor configured to determine the orientation of the device with respect to the mount at least in part by comparing an image characteristic of at least a portion of a captured image with respect to other portions of the captured image; and
a processor in communication with the orientation sensor and configured to trigger a notification when the orientation of the device changes with respect to the mount.

2. The system of claim 1, wherein the processor is further configured to trigger a notification when the orientation sensor determines that the camera is substantially level with respect to a horizon line.

3. The system of claim 1, additionally comprising a notification unit disposed within the device having at least one camera.

4. The system of claim 1, wherein the device comprises a phone.

5. The system of claim 1, wherein the orientation sensor is disposed within the device having at least one camera.

6. The system of claim 1, wherein the orientation sensor comprises at least one accelerometer or at least one gyroscope.

7. The system of claim 1, wherein the orientation sensor comprises an image processor configured to determine whether a reference line in a frame of captured image data is substantially level.

8. The system of claim 1, wherein the notification is non-visual.

9. The system of claim 8, wherein the non-visual notification comprises an audible sound.

10. The system of claim 8, wherein the non-visual notification comprises a haptic alert.

11. The system of claim 1, wherein the camera is in a location with respect to a user such that the user cannot visually monitor the orientation of the camera.

12. The system of claim 1, wherein the processor triggers a notification by providing a signal to a separate device which performs the haptic alert.

13. The system of claim 1, wherein the processor is disposed within the mount.

14. The system of claim 13, wherein the orientation sensor is disposed within the mount.

15. The system of claim 1, wherein the orientation sensor is configured to determine the orientation of the device with respect to the mount at least in part by comparing the relative brightness or luminance of pixels within at least a portion of the captured image with respect to the relative brightness or luminance of pixels within other portions of the captured image.

16. The system of claim 1, wherein the orientation sensor is configured to determine the orientation of the device with respect to the mount at least in part by comparing the color of pixels within at least a portion of the captured image with respect to the color of pixels within other portions of the captured image.

17. The system of claim 1, wherein the orientation sensor is configured to determine the orientation of the device with respect to the mount at least in part by identifying a separation in contrast within the captured image.

18. The device of claim 1, wherein the at least one camera comprises the orientation sensor.

19. A method comprising:
   determining the orientation of a camera secured to a mount at least in part by comparing an image characteristic of at least a portion of a captured image with respect to at least one other portion of the captured image;
   triggering the emission of a first non-visual cue when the camera is substantially level with respect to a horizon line; and
   triggering the emission of a second non-visual cue when the camera moves with respect to the mount.

20. The method of claim 19, wherein the camera is configured to be secured in a location with respect to a user such that the user cannot visually monitor the orientation of the camera.

21. The method of claim 19, wherein the first non-visual cue is different from the second non-visual cue.

22. The method of claim 19, wherein the comparing step includes capturing at least a first image with the camera and processing the captured image.

23. The method of claim 22, wherein the comparing step includes capturing at least a second image with the camera and comparing the second captured image with the first captured image.

24. The method of claim 19, wherein the signal triggers a separate device to trigger the emission of a first non-visual cue.

25. The method of claim 19, wherein comparing an image characteristic of at least a portion of the captured image with respect to other portions of the captured image comprises comparing the relative brightness or luminance of pixels within at least a portion of the captured image with respect to the relative brightness or luminance of pixels within other portions of the captured image.

26. The method of claim 19, wherein comparing an image characteristic of at least a portion of the captured image with respect to other portions of the captured image comprises comparing the color of pixels within at least a portion of the captured image with respect to the color of pixels within other portions of the captured image.

27. The method of claim 19, wherein comparing an image characteristic of at least a portion of the captured image with respect to other portions of the captured image comprises identifying a separation in contrast within the captured image.

\* \* \* \* \*